United States Patent
Hirayama

(10) Patent No.: US 8,482,239 B2
(45) Date of Patent: Jul. 9, 2013

(54) LOOP GAIN ADJUSTING CIRCUIT

(75) Inventor: Hideki Hirayama, Gifu-ken (JP)

(73) Assignee: ON Semiconductor Trading, Ltd., Hamilton (BM)

(*) Notice: Subject to any disclaimer, the term of this patent is extended or adjusted under 35 U.S.C. 154(b) by 283 days.

(21) Appl. No.: 13/152,846

(22) Filed: Jun. 3, 2011

(65) Prior Publication Data

US 2011/0298410 A1    Dec. 8, 2011

(30) Foreign Application Priority Data

Jun. 3, 2010   (JP) ................................. 2010-127629

(51) Int. Cl.
*G05B 19/408*   (2006.01)

(52) U.S. Cl.
USPC ...................... 318/568.22; 318/632

(58) Field of Classification Search
USPC ................. 318/625, 609, 610, 632, 568.22
See application file for complete search history.

(56) References Cited

U.S. PATENT DOCUMENTS

| | | | |
|---|---|---|---|
| 6,590,358 B1 * | 7/2003 | Tsutsui ........................ | 318/560 |
| 6,873,126 B2 * | 3/2005 | Inao et al. ................. | 318/400.28 |
| 7,679,303 B2 * | 3/2010 | Muroi et al. .................. | 318/437 |
| 7,788,819 B2 * | 9/2010 | Hon et al. ........................ | 33/503 |
| 2009/0086033 A1 | 4/2009 | Watanabe et al. | |
| 2009/0160959 A1 | 6/2009 | Watanabe et al. | |

FOREIGN PATENT DOCUMENTS

| | | |
|---|---|---|
| JP | 2009-86019 A | 4/2009 |
| JP | 2009151028 A | 7/2009 |

OTHER PUBLICATIONS

Espacenet, Patent Abstract for Japanese Publication No. 2009086019 Publication date Apr. 23, 2009 (1 page).
Espacenet, Patent Abstract for Japanese Publication No. 2009151028 Publication date Jul. 9, 2009 (1 page).

* cited by examiner

*Primary Examiner* — Rina Duda

(74) *Attorney, Agent, or Firm* — Osha Liang LLP

(57) ABSTRACT

In an adder circuit, a sine wave is added to a compensation signal which is generated based on a position detection signal of a member to be driven and for compensating a position of a lens which is the member to be driven. An absolute value integrating circuit integrates absolute values of signals before and after the adder circuit adds the sine wave. The two obtained integrated values are compared by a comparator circuit, and a gain adjusting circuit adjusts a gain of an amplifier which amplifies the compensation signal so that the two integrated values are equal to each other.

6 Claims, 2 Drawing Sheets

LOOP GAIN ADJUSTING CIRCUIT

CROSS-REFERENCE TO RELATED APPLICATIONS

The present application claims priority from Japanese Patent Application No. 2010-127629 filed on Jun. 3, 2010. The entire disclosure of Japanese Patent Application No. 2010-127629 filed on Jun. 3, 2010, including specification, claims, drawings, and abstract, is incorporated herein by reference in its entirety.

BACKGROUND OF INVENTION

1. Technical Field

One or more embodiments of the present invention relate to a loop gain adjusting circuit for a servo control in which a position of a member to be driven is detected, and the member to be driven is driven by an actuator such that the member to be driven is positioned at a target position.

2. Background Art

In control of various devices, a servo control is employed. In particular, in position control of a member, a servo control is widely in use which applies feedback control so that a detected position coincides with a target position.

In order to suitably execute such a servo control, loop gain in a feedback loop must be at a suitable value. Therefore, the loop gain must be adjusted. For the loop gain adjustment, a process has been applied in which, for example, a sine wave is added to a signal transmission path of the loop, the feedback loop is activated by the sine wave, and the loop gain is adjusted such that signals before and after the addition of the sine wave are identical. In other words, the signals before and after the addition are extracted, amplitudes of these signals are detected, and the loop gain is adjusted so that the amplitudes are equal to each other.

During the time when the signal goes through one loop, there may be cases where signal distortion occurs. In such a case, it is difficult to accurately measure the amplitude. In order to improve the precision of the amplitude measurement, for example, it may be necessary to calculate an average of measurement results of several periods.

SUMMARY OF INVENTION

According to one aspect of one or more embodiments of the present invention, there is provided a loop gain adjusting circuit for a servo control in which a position of a member to be driven is detected and the member to be driven is driven by an actuator such that the member to be driven is positioned at a target position, the loop gain adjusting circuit comprising a sine wave adding unit which adds a sine wave to a compensation signal which is for compensating the position of the member to be driven and which is generated based on a position detection signal of the member to be driven, and obtains a signal which drives the actuator with the sine wave, an absolute value integrating circuit which compares two integrated values obtained by the absolute value integrating circuit, and adjusts a gain of an amplifier which amplifies the compensation signal such that the two integrated values are equal to each other.

According to various aspects of one or more embodiments of the present invention, with the use of the absolute value integrated values, suitable comparison can be executed even when the waveform of the compensation signal is distorted, and the gain adjustment can more accurately executed.

DETAILED DESCRIPTION

One or more embodiments of the present invention will now be described with reference to the drawings. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

Figure 1:
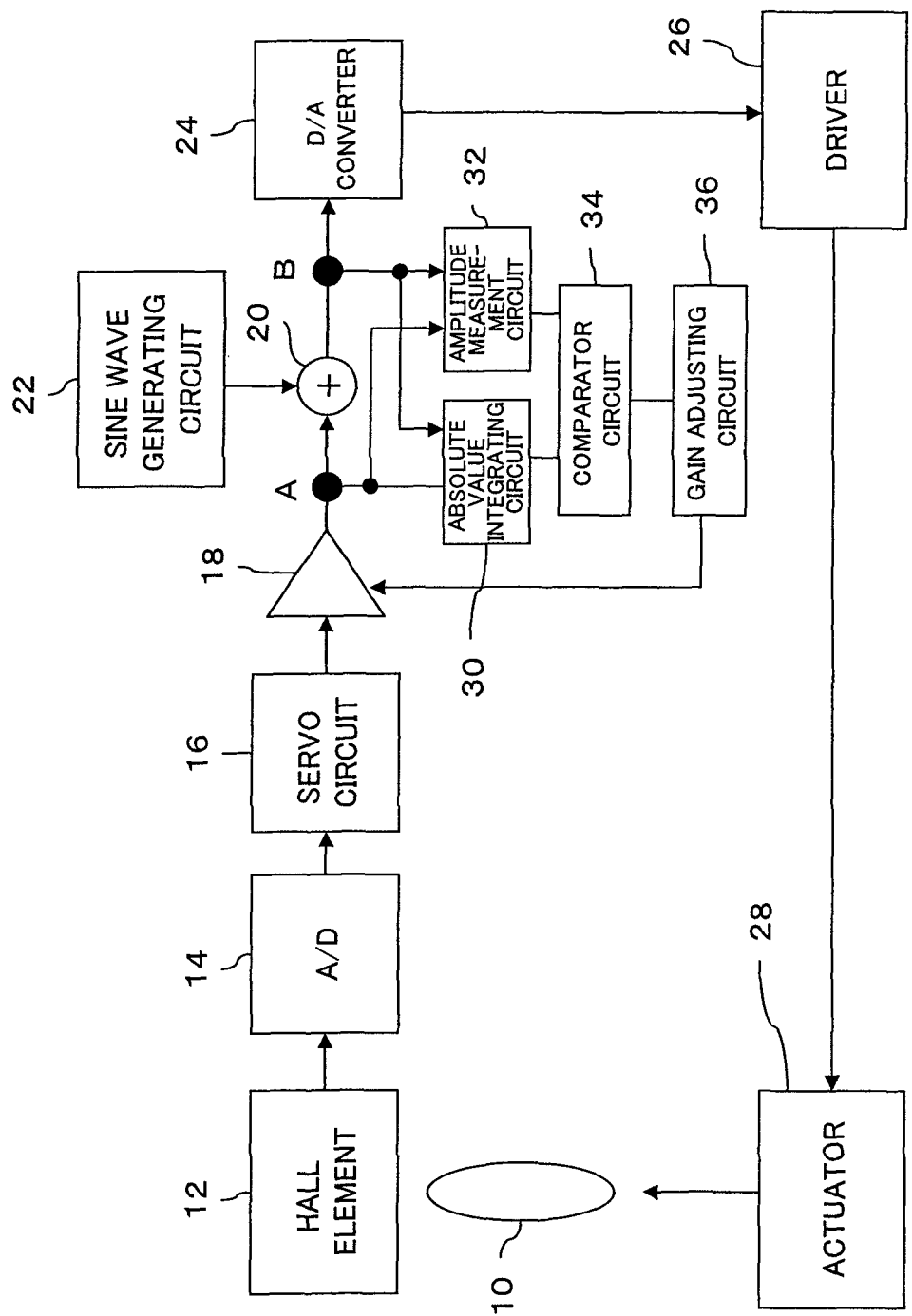
FIG. 1 is a block diagram showing a structure according to one or more embodiments of the present invention.
Figure 2:
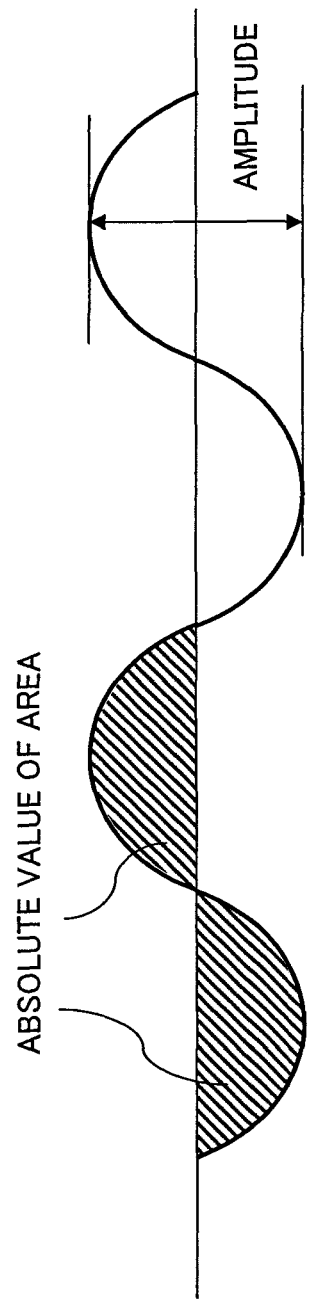
FIG. 2 is a diagram for explaining an absolute value integration of the sine wave according to one or more embodiments of the present invention.

FIG. 1 is a diagram showing an overall structure of one or more embodiments of the present invention. A loop gain adjusting device is used for adjusting of a loop gain for shake correction of a camera.

In the shake correction, shake is corrected by adjusting a position of a lens 10, which is a member to be driven provided in an optical system which forms an optical image on a light receiving surface of an imaging element.

A Hall element 12 detects a magnetic field from a magnet mounted on the lens 10, and outputs a position detection signal corresponding to a position of the lens 10. The position detection signal is converted into digital data by an A/D converter circuit 14, and input to a servo circuit 16.

In the servo circuit 16, an amount of movement of the camera is supplied from the gyro sensor (not shown) is added, an compensation data for moving the lens 10 to a target position is calculated based on the position of the lens 10. During the adjustment of the loop gain, no signal is sent from the gyro sensor, and a difference between a position of an origin of the lens 10 and the position detection signal is output as the compensation data.

The obtained compensation data is amplified with a predetermined gain by the gain adjusting amplifier 18, and is supplied to an adder circuit 20. A sine wave from a sine wave generating circuit 22 is supplied to the adder circuit 20. The sine wave is set at a frequency which can be followed and which is about 100 Hz, and at amplitude which can be followed.

A signal after addition is converted into an analog signal by a D/A converter 24, and supplied to a driver 26. The driver 26 generates a control signal for driving an actuator 28 based on the signal supplied from D/A converter 24, and supplies the generated control signal to the actuator 28.

The actuator 28 comprises a voice coil or a piezo element, and drives the lens 10 according to the control signal from the driver 26. A permanent magnet is mounted on the lens 10, and the movement of the lens 10 is detected by the Hall element 12.

A sine wave is supplied to the adder circuit 20. The actuator 28 drives the lens 10 according to the added sine wave, and the movement of the driven lens 10 is detected by the Hall element 12. The servo circuit 16 generates compensation data to move the lens 10 to the position of the origin.

In one or more embodiments of the present invention, the signals before and after the adder circuit 20 are supplied to an absolute value integrating circuit 30. The absolute value integrating circuit 30 outputs data of areas of one period for the two input signals. In other words, the absolute value integrating circuit 30 outputs a full-wave rectified value for each of the two input signals. The duration is not necessarily limited to one period, may be greater than or equal to one period, or less than one period. However, when the duration is too short, sufficient precision cannot be achieved, and when the duration is too long, the control period would be elongated. Therefore, in one or more embodiments of the present invention, one period may be selected. Alternatively, the duration may be set to a few periods.

The values of the absolute value integrated values of the signals before and after the adder circuit 20 are supplied to a comparator circuit 34 where the signals are compared. In the comparator circuit 34, a comparison is executed to determine which of the integrated values, of the signal before addition and the signal after the addition, is greater than the other.

A comparison result of the comparator circuit 34 is supplied to a gain adjusting circuit 36. The gain adjusting circuit 36 changes the gain such that the values of the absolute value integrated values of the signals before and after the adder circuit 20 are equal to each other. That is, the gain adjusting circuit 36 reduces the gain when the integrated value of the signal before the adder circuit 20 is greater and increases the gain when the integrated value of the signal after the adder circuit 20 is greater.

For changing the gain in the gain adjusting amplifier 18, a configuration may be considered in which the gain is sequentially changed with a fixed value at each control step. In this configuration, however, when the gain differs significantly from the correct gain, a long time would be required for controlling to a suitable value.

In consideration of this, in one or more embodiments of the present invention, a consecutive comparison method or a division method is employed. In the consecutive comparison method, when the size of the signal at a point A is A and a size of the signal at a point B is B, the sizes of A and B are compared, and, according to the comparison result, the gain value of the gain adjusting amplifier 18 is adjusted by consecutively determining from the upper significant bit to the lower significant bit. For example, when the gain value of the gain adjusting amplifier 18 is represented by a digital value of 16 bits, the gain value is set to 8000h (0100000000000000), and a sine wave is supplied. When A≧B, the gain value when the bit 15 is set to "1" is greater than the target gain value. Therefore, the bit 15 is determined to be "0", and the gain value is changed to 4000h (0010000000000000), for adjustment of lower significant bits. When A<B, the gain value when the bit 15 is set to "1" is lower than the target gain value. Therefore, the bit 15 is determined to be "1", and the gain value is changed to c000h (0110000000000000), for adjustment of the lower significant bits. In other words, "1" is set for the bit in the gain value to be examined, and a sine wave is supplied. When A≧B, this bit is determined to be "0", and when A<B, the bit is determined to be "1". In the division method the current gain is multiplied by a ration of the signals, A/B, to correct the gain. Alternatively, these three methods may be suitably combined. For example, a configuration may be such that the consecutive comparison method or a division method is employed when the difference between A and B is great, and the addition/subtraction of a fixed value is employed when the difference is less than or equal to a certain value.

In this manner, in one or more embodiments of the present invention, the absolute value integrated value is employed for the measurement of the sizes of the signals of points A and B. With this configuration, full waveform data of one period of the sine wave can be used, and averaging of several periods of the sine wave becomes no longer necessary, resulting in shortening of the adjustment time. Depending on the type of the actuator 28, the waveform after one loop may be distorted, and the amplitude may not be detected with high precision. With the absolute value integrated value, the influence of the waveform distortion can be reduced even in such cases.

In one or more embodiments of the present invention, an amplitude measurement circuit 32 is also provided, and amplitudes of several periods may also be measured. According to the characteristic of the actuator 28, it is possible to select between the amplitude and the absolute value integrated value. The switching may be executed in a manner similar to the determined loop gain. That is, the switching may be executed by storing a signal of a nonvolatile memory or like the reading this signal.

When the loop gain is determined in this manner, the setting value is written to a nonvolatile memory or the like, and the servo control is subsequently executed using the written loop gain. In addition, it is possible to execute the setting process of the loop gain as described above with an appropriate frequency, such when the power supply is turned ON or turned OFF. With this process, the change with respect to time the servo control can also be handled.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A loop gain control circuit for servo control in which a position of a member to be driven is detected and the member to be driven is driven by an actuator such that the member to be driven is positioned at a target position, the loop gain adjusting circuit comprising:
   a sine wave adding unit that adds a sine wave to a compensation signal,
      wherein the compensation signal compensates the position of the member to be driven and is generated based on a position detection signal of the member to be driven, and
      wherein the sine wave adding unit obtains a signal which drives the actuator with the sine wave;
   an absolute value integrating circuit that integrates an absolute value of each signal before and after the sine wave adding unit adds the sine wave; and
   a gain adjusting circuit that compares two integrated values obtained by the absolute value integrating circuit, and adjusts a gain of an amplifier,
      wherein the amplifier amplifies the compensation signal such that the two integrated values are equal to each other.

2. The loop gain adjusting circuit according to claim 1, wherein the absolute value integrating circuit integrates the absolute value for one period of each of the signals before and after the sine wave is added.

3. The loop gain adjusting circuit according to claim 1, wherein the gain adjusting circuit reduces the gain when the signal before the sine wave that is added is greater, and increases the gain when the signal after the sine wave that is added is greater.

4. The loop gain adjusting circuit according to claim 3, wherein the gain adjusting circuit changes the gain through a consecutive comparison method.

5. The loop gain adjusting circuit according to claim 3, wherein the gain adjusting circuit changes the gain through a division method.

6. The loop gain adjusting circuit according to claim 1, further comprising:
    an amplitude measurement circuit that measures amplitudes of the signals for several periods before and after the sine wave adding unit adds the sine wave,
    wherein the gain adjusting circuit executes the comparison by selecting one of the absolute value integration values from the absolute value integrating circuit and amplitude values from the amplitude measurement circuit.

* * * * *